(12) United States Patent
Jacobson

(10) Patent No.: US 8,386,622 B2
(45) Date of Patent: Feb. 26, 2013

(54) METHOD AND APPARATUS FOR FACILITATING COMMUNICATION IN A CONTENT CENTRIC NETWORK

(75) Inventor: Van L. Jacobson, Woodside, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 236 days.

(21) Appl. No.: 12/332,560

(22) Filed: Dec. 11, 2008

(65) Prior Publication Data

US 2009/0287835 A1 Nov. 19, 2009

Related U.S. Application Data

(60) Provisional application No. 61/054,067, filed on May 16, 2008.

(51) Int. Cl.
*G06F 15/16* (2006.01)
(52) U.S. Cl. ......... 709/229; 709/219; 709/227; 709/245
(58) Field of Classification Search .................. 709/203, 709/217, 219, 227, 229, 223, 224
See application file for complete search history.

(56) References Cited

U.S. PATENT DOCUMENTS

| | | | |
|---|---|---|---|
| 6,385,728 B1 * | 5/2002 | DeBry | 726/9 |
| 6,574,377 B1 * | 6/2003 | Cahill et al. | 382/305 |
| 7,496,668 B2 * | 2/2009 | Hawkinson et al. | 709/227 |
| 2002/0010795 A1 * | 1/2002 | Brown | 709/245 |
| 2003/0051100 A1 | 3/2003 | Patel | |
| 2004/0030602 A1 * | 2/2004 | Rosenquist et al. | 705/22 |
| 2004/0221047 A1 * | 11/2004 | Grover | 709/229 |
| 2005/0028156 A1 * | 2/2005 | Hammond et al. | 718/100 |
| 2007/0073888 A1 * | 3/2007 | Madhok | 709/227 |
| 2007/0204011 A1 * | 8/2007 | Shaver et al. | 709/219 |
| 2007/0255699 A1 * | 11/2007 | Sreenivas et al. | 707/4 |
| 2008/0010366 A1 * | 1/2008 | Duggan | 709/223 |
| 2008/0046340 A1 * | 2/2008 | Brown | 705/26 |

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.
Jacobson, Van et al., "Content-Centric Networking, Whitepaper Describing Future Assurable Global Networks", Palo Alto Research Center, Inc., Jan. 30, 2007, pp. 1-9.

* cited by examiner

*Primary Examiner* — Barbara Burgess
(74) *Attorney, Agent, or Firm* — Shun Yao; Park, Vaughan, Fleming & Dowler LLP

(57) ABSTRACT

One embodiment of the present invention provides a system for facilitating communication in a content centric network (CCN). During operation, the system receives at a first node from an interest owner an interest in a piece of content. The interest indicates a structured name for the content. Furthermore, the name is unique and persistent with respect to the content, and where the name includes authentication information for the content. Next, the system determines whether content available at the first node satisfies the interest. If so, the system sends the content to the interest owner. Otherwise, the system marks the interest as pending, and forwards the interest to a second node in the network based on the interest. After receiving content from the second node in response to the forwarded interest, the system un-marks the interest as pending and sends the content to the interest owner.

22 Claims, 5 Drawing Sheets

METHOD AND APPARATUS FOR FACILITATING COMMUNICATION IN A CONTENT CENTRIC NETWORK

RELATED APPLICATION

This application claims the benefit under 35 U.S.C. §119 (e) to:
U.S. Provisional Patent Application No. 61/054,067, entitled "CONTENT CENTRIC NETWORKING," by inventor Van Jacobson, filed 16 May 2008,
the contents of which are incorporated by reference herein.
The subject matter of this application is related to the subject matter in the following applications:
U.S. patent application Ser. No. 12/123,344, entitled "VOICE OVER CONTENT CENTRIC NETWORKS," by inventors Paul Stewart, Van Jacobson, Michael Plass, and Diana Smetters, filed 19 May 2008; and
U.S. patent application Ser. No. 12/338,175, entitled "CONTROLLING THE SPREAD OF INTERESTS AND CONTENT IN A CONTENT CENTRIC NETWORK," by inventors Van Jacobson and Diana K. Smetters, filed Dec. 18, 2008;
the disclosures of which are incorporated by reference in their entirety herein.

FIELD

The present disclosure relates generally to facilitating communication over a network. More specifically, the present disclosure relates to a method and an apparatus for facilitating communication over a content centric network.

RELATED ART

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. That is, a consumer of content can only receive the content by explicitly requesting the content from an address (e.g., IP address) closely associated with a physical object or location. This restrictive addressing scheme is becoming progressively inadequate for meeting the ever-changing network demands.

The current architecture of the Internet revolves around a conversation model, which was created in the 1970s for the ARPAnet to allow geographically distributed users to use a few big, immobile computers. This architecture was designed under the influence of the telephone network, where a telephone number is essentially a program that configures the switches along a path from the source to the destination. Not surprisingly, the designers of the ARPAnet never expected it to evolve into today's ubiquitous, relentlessly growing Internet. People now expect a lot more from the Internet than what the ARPAnet was designed for. Ideally, an Internet user should have access to any content, anywhere, at any time—a task that is difficult to perform with the current location/device-binding IP protocol.

Under current web-based naming structures, the identity, address, or location idea of a host is implicit in the name which contains the corresponding content. For example, http://www.amazon.com/index.html can be found by contacting a machine at the address www.amazon.com. But these addressing schemes require a Domain Name System (DNS) to translate a human-readable hostname into an IP address (e.g., 209.34.123.178). In current computer systems, there is no way for a client to refer to a piece of content without knowing the IP address of the host that the file is stored on, and even then the contents associated with that file name might change.

Some computer systems use distributed hash tables (DHTs) to locate content by naming content with fixed-length keys, typically 160-bit opaque binary blobs. To retrieve a piece of content, a DHT-enabled system first obtains the content's "name," and then uses a mapping from this name onto a set of servers in order to determine the server or servers from which the content might be retrieved.

DHT systems use opaque binary names that are treated as keys to indicate which host or hosts in a self-organizing ring of DHT hosts are responsible for holding that content. However, DHT names are not human-readable. In addition, DHT systems assume a fully connected network, where content will always be found at a particular location based on the 160-bit opaque name.

DHT systems provide limited dynamism. DHT systems use forward and back pointers are used to traverse the map from opaque names, or keys, to hosts, so that hosts can be added to or removed from a DHT ring. However, the mapping from DHT names to data is fixed, and one cannot find the data outside that ring.

Other computer systems in peer-to-peer networks typically find content by title either indirectly through a directory server (e.g., Napster), which maintains a lookup table that maps content names to hosts, or by flooding interest to all the hosts in the network, along with information about where to return matching results to the interest.

Content names in all of these approaches are "flat," with no relationship contained in them other than perhaps which host holds them.

Protocol-Independent Multicast Sparse Mode (PIM-SM) is a protocol that allows routing content on-demand using tree-based routing. In PIM-SM, nodes interested in receiving particular IP multicast "channels" (represented as IP addresses drawn from the set designated for multicast) register to receive that content with a multicast-capable router or switch "upstream" from them. That router then recursively registers to receive that content. When the content is generated on that address, the routers can look at their various outgoing interfaces or switch ports for those where such interest has been registered, and forward the new content only on those.

PIM-SM and other forms of multicast routing only generate multicast trees over a small space of IP addresses and do not provide flow control. In other words, a single interest in content can open the floodgates for any and all available content, thus potentially drowning a network and causing multicasting to be disabled or throttled back. This is because PIM-SM and other forms of multicast routing do not cause an interest to be consumed when matching content is found.

SUMMARY

One embodiment of the present invention provides a system for facilitating communication in a content centric network (CCN). During operation, the system receives at a first node from an interest owner an interest in a piece of content. The interest indicates a structured name for the content. Furthermore, the name is unique and persistent with respect to the content and includes authentication information for the content. Next, the system determines whether content available at the first node satisfies the interest. If so, the system sends the content to the interest owner. Otherwise, the system marks the interest as pending, and forwards the interest to a second node in the network based on the interest. After receiving content from the second node in response to the forwarded interest, the system un-marks the interest as pending and sends the content to the interest owner.

In one variation on this embodiment, the system determines whether the received content satisfies the interest and optionally notifies the interest owner about whether the received content satisfies the interest.

In one variation on this embodiment, the system authenticates the received content using information carried by the name and optionally notifies the interest owner about whether the received content is authentic.

In one variation on this embodiment, the system caches the received content at the first node, thereby making the content available for future interests.

In one variation on this embodiment, the content is digitally signed such that the content can be verified by one or more nodes in the network.

In one variation on this embodiment, the interest corresponds to a portion of the content system, sending the content to the interest owner comprises sending the portion of the content corresponding to the interest, and continued receipt of interests of the same content facilitates flow control of the delivery of the content.

In one variation on this embodiment, a second interest in the interest is received from a content provider, thereby allowing the content provider to solicit interest in the content.

In one variation on this embodiment, the interest is digitally signed, thus enabling the interest to be authenticated prior to returning content in response to the interest.

In one embodiment, the system (or a human) generates an interest in a piece of content, where the interest indicates a structured name for the content, where the name is unique and persistent with respect to the content, and where the name includes authentication information for the content. Next, the system (or the human) sends the interest to a node in the network.

DETAILED DESCRIPTION

Figure 1:
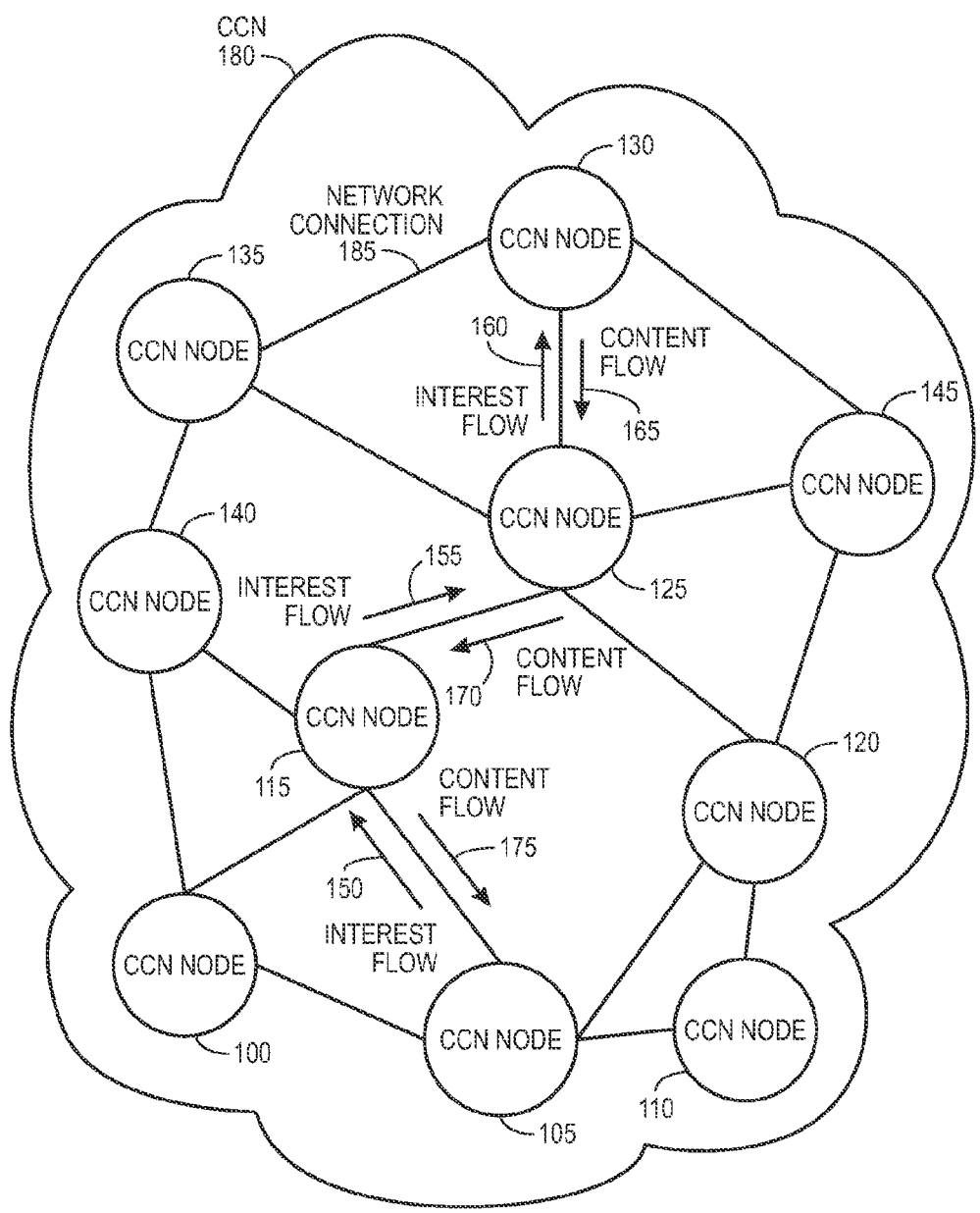
FIG. 1 illustrates an exemplary architecture of a CCN in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

Embodiments of the present invention provide an architecture for a content centric network (CCN), which brings a new approach to content transport. Instead of having network traffic viewed at the application level as end-to-end conversations over which content travels, content is requested or returned based on its unique name, and the network is responsible for routing content from the provider to the consumer. Note that content includes data that can be transported in the communication system, including any form of data such as text, images, video, and/or audio. A consumer and a provider can be a person at a computer or an automated process inside or outside the CCN. A piece of content can refer to the entire content or a respective portion of the content. For example, a newspaper article might be represented by multiple pieces of content embodied as data packets. A piece of content can also be associated with meta-data describing or augmenting the piece of content with information such as authentication data, creation date, content owner, etc. The present invention comprises a computer-implemented system to facilitate communication in a CCN. We will refer to the system interchangeably with the CCN as the properties of the system are the properties of the CCN and vice versa.

A CCN can significantly improve the efficiency and usability of content dissemination by enabling content caching. A CCN can also improve content mobility by enabling content to move since content can be addressed by name rather than location.

In some embodiments, a CCN host can identify, request, and disseminate content based on the content's name, as opposed to a name of a content container, such as a file. Note that there is a subtle but significant distinction between a content name and a container name. A container name is just a label of a file. A content name used in a CCN as described herein, in contrast, is unique and persistent with respect to the content and has a direct one-to-one association with the substance of the content.

Unlike IP addresses, a content name does not necessarily indicate the location of the content, and the CCN is responsible for routing the content. In a CCN, content names are persistent and content-specific. That is, if one changes the content, the content is effectively associated with a new name. This persistency can be achieved with an explicit versioning mechanism, where, for example, the new content can be "version 4" of a given name. The persistency can also be achieved implicitly. For example, contents can be associated with not only their human-established names, but also with authentication meta-data (e.g., a digital signature by the publisher of the content). As a result, the name associated with content changes when the content changes.

Functionally, a CCN can retain association between various names and the content which they represent. In one embodiment, the names are hierarchical and in many situations can be understood by a user. For example, "/abcd/bob/papers/ccn/news" could be the name of the content, i.e., the "news" article from the "ccn" collection of papers for a user named "Bob" at the organization named "ABCD." In a CCN, there is no need for a content consumer to determine how to find the "ABCD" organization, or to find which host holds Bob's CCN publications from an application's perspective. A content consumer is any entity, person, or machine that requests the content.

In one embodiment, to request a piece of content, a CCN node registers (e.g., broadcasts) an interest in that content by the content's name. An interest in a piece of content can be a query for the content according to the content's name or identifier. The content, if available in the network, is routed back to it by the host that stores the content. In one embodiment, the routing infrastructure intelligently propagates the interest to the prospective nodes that are likely to have the information and then carries available content back along the path which the interest traversed.

A CCN has additional properties which make it especially appealing. For example, all content can be cryptographically authenticated, meaning that some subset of nodes on the network (e.g., a legitimate querier of the content) can verify the authenticity of a piece of content. A CCN also allows content to be accessed by name, independent of its publisher.

At the same time, embodiments of the present invention can specialize requests for content by a certain publisher. For example, one can ask for "foo.txt," or "foo.txt signed by Bob." Any forms of self-verifying names can be used as a contract between a producer and the consumer. It is also possible to use hybrid self-verifying names, where the former components of the name are for organization and efficient routing, and the latter components of the name are self-verifying. In addition, CCN allows the separation of content and trust, enabling different content consumers to use different mechanisms for establishing trust in the same piece of content. Although content might have been signed by a single publisher, it can be trusted for different reasons. For example, one user might trust a given piece of content because of a direct personal connection with its signer, whereas another user might trust the same content because of the content signer's participation in a public key infrastructure (PKI) which that user has chosen to trust.

FIG. 1 illustrates an exemplary architecture of CCN, in accordance with an embodiment of the present invention. In this example, a CCN 180 comprises CCN nodes 100-145. Each node in the CCN is coupled to one or more other nodes. Network connection 185 is an example of such a connection. The network connection is shown as a solid line, but each line could also represent sub-networks or super-networks which can couple one node to another node. CCN network 180 can be a local network, a super-network or a sub-network. Each of these networks can be interconnected so that a node in one network can reach a node in other networks. The network connection can be broadband, wireless, telephonic, satellite, or any type of network connection. A CCN node can be a computer system or an end-point representing users and/or devices that can generate interests or originate content.

In accordance with an embodiment of the present invention, a consumer can generate an interest in a piece of content and then send that interest to a node in CCN 180. The piece of content can be stored at a node in CCN 180 by a publisher or content provider, who can be located inside or outside the network. For example, in FIG. 1, the interest in a piece of content originates at CCN node 105. If the content is not available at the node, the interest flows to one or more nodes coupled to the first node. For example, in FIG. 1, the interest flows (interest flow 150) to CCN node 115, which does not have the content available. Next, the interest flows (interest flow 155) from CCN node 105 to CCN node 125, which again does not have the content. The interest then flows (interest flow 160) to CCN node 130, which does have the content available. The flow of the content then retraces its path (content flows 165, 170, and 175) until it reaches CCN node 105, where the content is delivered. Other processes such as authentication can be involved in the flow of content.

In CCN 180, any number of intermediate nodes (CCN nodes 100-145) in the path between a content holder (CCN node 130) and the interest generation node (CCN node 105) can participate in caching local copies of the content as it travels across the network. Caching reduces the network load for a second subscriber located in proximity to other subscribers by implicitly sharing access to the locally cached content. In FIG. 1, if CCN node 100 were to register an interest in the same content as CCN node 105, a locally cached copy of the content stored on CCN node 115 can satisfy the interest without traversing the entire content path all the way back to CCN node 130.

Furthermore, CCN 180 can provide better fault tolerance because content can be retrieved from multiple nodes if one node fails suddenly. In a CCN, a piece of content can be self-authenticating, which means that the content contains its own authentication. In one embodiment, each fragment of a piece of content can be digitally signed by someone trusted by the consumer so that it can be cached, replicated, and obtained from anyone and its integrity and authenticity confirmed.

In embodiments of the present invention, a CCN host combines self-authenticating content, names which are directly treated as content addresses, and the pairing of interests and data to provide flow control. This approach enables a dynamic, name-based communication protocol. Because of the dynamic routing of interests and content back to interested parties, the resulting network is resilient to node departure and network partition, and provides intrinsic mechanisms to facilitate node mobility. For example, CCN node 100 may migrate and become coupled with CCN node 105. Since CCN 180 finds content by name, a content provider can move from node to node while providing content, much as cell-phone user can move from cell to cell while communicating.

There are significant advantages to a CCN's dynamic name-based routing approach. First, in contrast to DHTs, a content producer has control over who is responsible for storing and providing its content. Other nodes in a CCN can cache that content and provide it as well, but the base nodes which serve as the initial source of content are determined by the default routes for a given name prefix. For DHTs, the node or nodes responsible for serving a particular piece of content are determined semi-randomly by which nodes end up responsible for what portion of the key space. Such nodes' policies and reliability are out of the control of the content producer, and their location might be suboptimal for content retrieval.

Second, security in a CCN is content-based: data can be stored anywhere, or retrieved from anyone. This results in higher data security and significantly increased network efficiency. Third, a CCN can operate in flow balance, providing inherent fairness, rate limitations, and dynamic response to changing network conditions.

Overall System Operation

Figure 2:
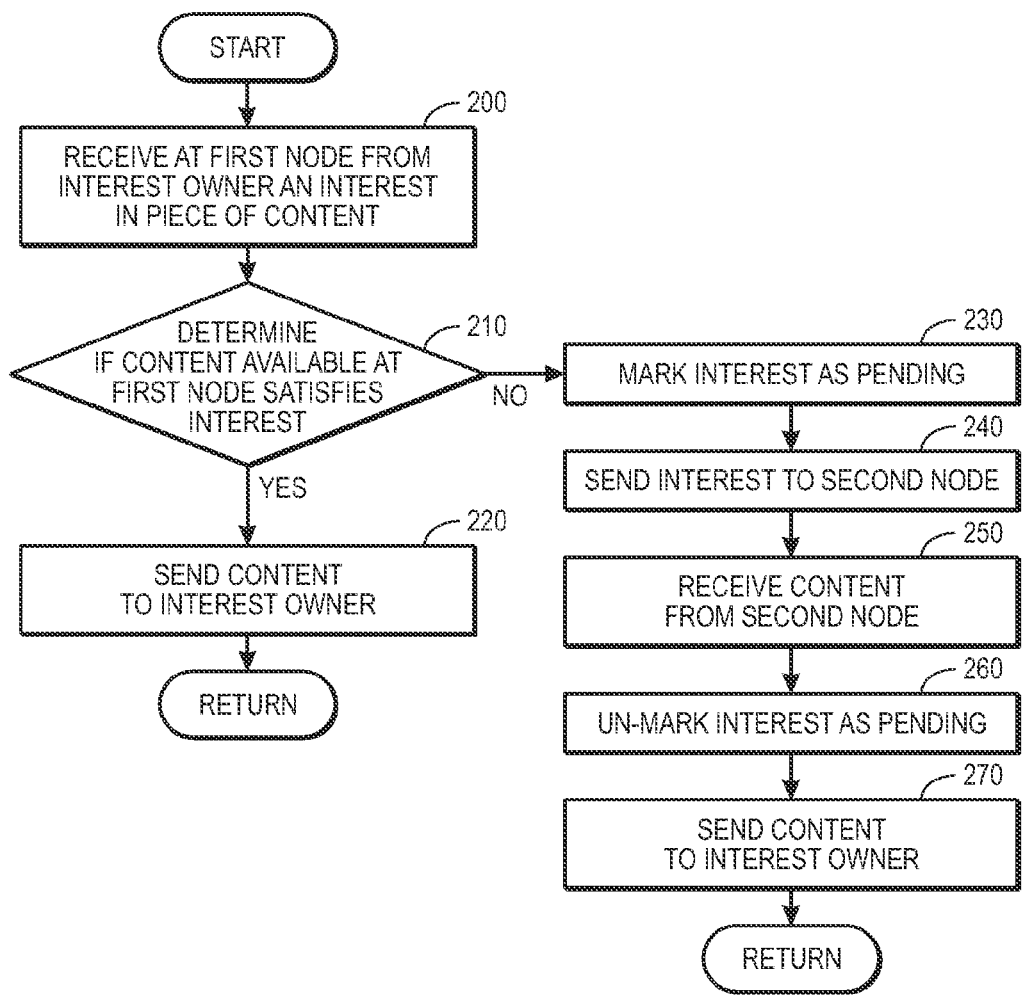
FIG. 2 presents a flowchart illustrating the process of facilitating communication in a CCN in accordance with an embodiment of the present invention.

FIG. 2 presents a flowchart illustrating the process of facilitating communication in a CCN in accordance with an embodiment of the present invention. During operation, the system receives at a first node from an interest owner an interest in a piece of content (operation 200), where the interest indicates a structured name for the content. Note that the name is unique and persistent with respect to the content. In one embodiment, the name includes authentication information for the content, and at least a portion of the name is not associated with a location or an address. Next, the system determines whether content available at the first node satisfies the interest (decision 210). If so, the system sends the content to the interest owner (operation 220). Otherwise, the system marks the interest as pending (operation 230), and sends the interest to a second node in the network based on the interest (operation 240). Marking the interest as pending can be implemented with various marking methods, including hash tables, bloom filters, linked lists, and/or arrays.

The system can use various routing methods to determine which second node to send the interests to. For example, the system can use an information foraging policy, where interests flow to where content is most likely to be, and content flows back along the same path to return to the node expressing the interest.

The system can also route content on-demand to those nodes which have registered an interest in receiving that content upon publication of the content. For example, nodes interested in receiving a particular multicast channel can register interest to receive that content with a multicast capable router or switch "upstream" from them. The router can then recursively register interest to receive that content, and so on. When the content is generated at the source, routers closest to the source can examine various interfaces or ports from which such an interest has been registered, and forward the new content only on those interfaces or ports. The result is bandwidth-efficient tree-based routing of content to hosts which may be widely distributed in terms of network topography.

After receiving content from the second node in response to the sent interest (operation 250), the system un-marks the pending interest (operation 260) and sends the content to the content owner (operation 270). Other than marking an interest as pending, the system does not need to maintain any other state information about the interest.

Note that the interest owner is not necessarily the original entity that generates the initial interest. The interest owner is the previous node (or person), which sent the interest to the first node. Thus, interest ownership is relative. For example, node A could be the interest owner for node B, which could be the interest owner for node C.

Note also that the second node can be in a local network, a super-network, or a sub-network. A routing policy at the first node determines to which node (and which network) the interest should be sent. The interest is sent to a second node based on this policy and the interest.

Named Content

A CCN can associate names with content, where the names are persistent. The term "persistent" means that the content can move around, but the name stays with the content. In previous Internet communication models, if a content server dies and the content moves around, the server name for the content must be changed. In a CCN, the content name remains unchanged. This enables an interest in a piece of content to find the content wherever it might reside.

The term "persistent" also means that if the content changes, then the name changes. The new name can be automatically generated as a version of the original name, can be associated with authentication meta-data (e.g., a digital signature by the publisher of the content), and can reflect the nature of the content change.

Names in a CCN can be structured by dividing them into components. For example, in /parc/home/smetters/test.txt, the individual name components are parc, home, smetters, and test.txt. Structured names also enable efficient routing for named content. A component-wise structure allows a hierarchical organization of names and a logarithmic efficiency in accessing content by name. There is no single "root" for a CCN naming scheme. However, the naming scheme can be modeled as a forest of trees. Names can be structured in various ways. For example, they can be structured in a left-oriented prefix-major fashion. For example, the name /parc/home/smetters can be a "parent" of /parc/home/smetters/test.

Name components can be binary strings and can be opaque to the underlying network. More generally, a semantic meaning to a name component is an agreement, or convention between name producers and consumers. Names can also be text or in a form where low-level CCN nodes can understand the meaning of "special" name components.

In sum, the system associates names (content identifiers) with content. Because of this naming convention, CCN content can be addressed, located, retrieved, cached, and disseminated by its name. In a CCN, obtaining content means publishing an interest in the name associated with the content. The CCN determines how to route information based on the name. Each time an interest is satisfied by content, the interest is erased, thus ensuring flow balance (a node does not send more content than is wanted). To receive another fragment of content, the consumer may need to express another interest. Thus, a CCN pairs interests with content to provide efficient congestion control, which can be scaled automatically with the properties of network links, regardless of link bandwidth.

Using Names in Communicating Transport State

In a typical communication transaction, a receiver generally communicates what the receiver wants to the sender. Moreover, what the receiver wants can change as communication progresses. For example, a TCP (Transmission Control Protocol) session models communications as the transfer of a linear sequence of bytes. In a TCP session, a receiver announces what it wants with an identifier (in the acknowledgement field of a packet header) associated with the first packet (in a sequence of packets) that the receiver does not yet have. The identifier represents the transport state. For performance reasons, it is important to have a compact expression of what the receiver wants. In addition, for scaling purposes, it is important that this expression (which track the communication state) be expressed explicitly and unambiguously in the receiver's interest or acknowledgement packets. This is because any implicit state expression typically has to reside in the network, which means that burden on the network to maintain the state information increases as the size, geographic scale, bandwidth, and network usage increases.

In contrast, a CCN does not model communication as a linear transfer of bits. Instead a CCN models communication as satisfying interests in tree-structured collections of data. A CCN can compactly express the boundary between what a receiver has received and what the receiver wants to receive. This feature enables a CCN to scale up with network size, bandwidth, and geographic scale. Moreover, in a CCN, a node views the entire name tree as ordered. That is, if the content names are viewed as bit strings, the order can be defined by numerical comparison. Note that in an ordered tree, it is possible to describe what a node wants in relation to what the node has. In addition, the description of what a node wants in relation to what the node has can be correctly interpreted by any potential sender, even if the sender only knows random portions of the name tree. In a CCN, the tree relationship can be simple (e.g., child, right sibling, farthest right sibling, etc.) or complex (e.g., "any child not matching a specified Bloom filter on the node values").

Satisfying Interests with Content

Interests in content can be satisfied (i.e., matched) in a prefix-oriented fashion. For example, an interest in /parc/home/smetters will match both /parc/home/smetters/test.txt and /parc/home/smetters/bar.txt. The longest match, in terms of the number of name components, is considered the best. Names can also be right-oriented or can have other forms of internal structure. Similarly, the satisfaction of names against interests can include more complex matching methods.

Figure 3:
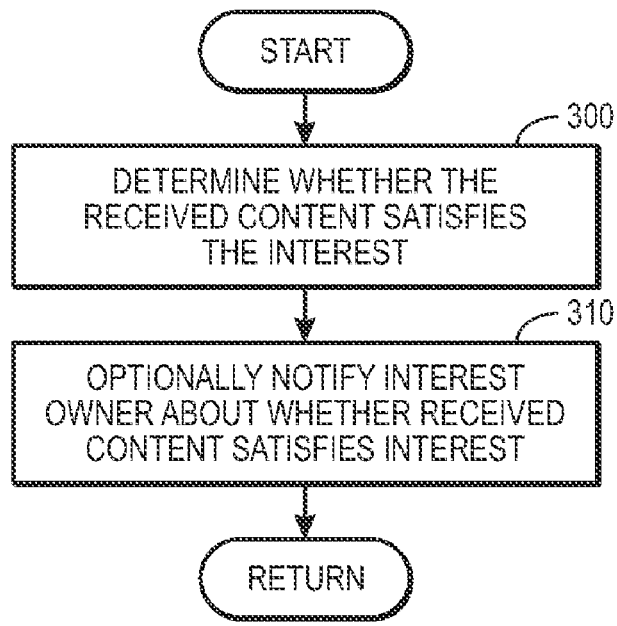
FIG. 3 presents a flowchart illustrating the process of determining whether the received content satisfies an interest in a CCN in accordance with an embodiment of the present invention.

FIG. 3 presents a flowchart illustrating the process of determining whether the received content satisfies an interest in accordance with an embodiment of the present invention. During operation the system first determines whether the received content satisfies the interest (operation 300). Next, the system optionally notifies the interest owner about whether the received content satisfies the interest (operation 310).

Self-Authenticating Content

Authentication is the process of determining that the content is generated by a source that one believes is the correct source and unaltered in transit. In accordance with embodiments of the present invention, the system can achieve authentication in several ways.

One way that the system can authenticate content is to use self-verifying content names. A self-verifying name for a piece of content can include a cryptographic (e.g., SHA-1) digest, so that once one learns the "name" one wanted, one could verify that one has found the correct content that corresponds to the name. A self-verifying name for a networked host (e.g., the host responsible for storing and replying to interests in a given piece of content) might be the cryptographic digest of that host's public key; if one makes a secure (e.g., Transport Layer Security/Secure Sockets Layer) connection to that host one could verify that one was indeed talking to the intended target by verifying that it knew the private key corresponding to the digest one used to identify it.

Another approach to facilitating self-verifying content names is to include the digest of the public key of the content publisher in the content name. The consumer of that content can attach no semantics to that name other than who is supposed to generate it.

In one embodiment, a CCN content producer can generate content names from a cryptographic digest of the publisher's public key and a label, or friendly name, given by the publisher. Labels can be drawn from a flat (i.e., nonhierarchical) namespace. In this approach, the name of a piece of content is tightly keyed to the content publisher, but different fragments of the same content for a given publisher can be identified by label.

Specifically, the system can authenticate name-content associations, rather than just content. For example, what a publisher "says" when they insert content into a CCN is "N is my name for content C." A content publisher can digitally sign the mapping from the name N to the content C. In one embodiment, the complete name of a piece of CCN content includes the name along with the signature on that name. The CCN content can also include authentication meta-data (e.g., an identifier of the publisher, such as the cryptographic digest of his public key, a timestamp, and a representation of the type of the content).

This approach has several advantages. First, it allows content to be accessed by name, independent of publisher. At the same time, it is possible to specialize requests for content by publisher (one can ask for foo.txt, or "foo.txt signed by Bob"). Second, it can be a superset of other approaches—it is possible to use any of the above forms of self-verifying names, as a contract between a producer and a consumer. It is also possible to use hybrid self-verifying names, where the former name components of the name are for organization and efficient routing, and the latter name components are self-verifying. Third, this approach allows the separation of content and trust and enables different content consumers to use different mechanisms for establishing trust in the same piece of content. That content might have been signed by one publisher, but the publisher can be trusted for reasons that are dependent on the interest owner. For example, the interest owner might work for the same company as the content owner and therefore trust that the content is authentic. Or the content owner might be untrustworthy, in which case the interest owner might not trust any content from this content owner.

Figure 4:
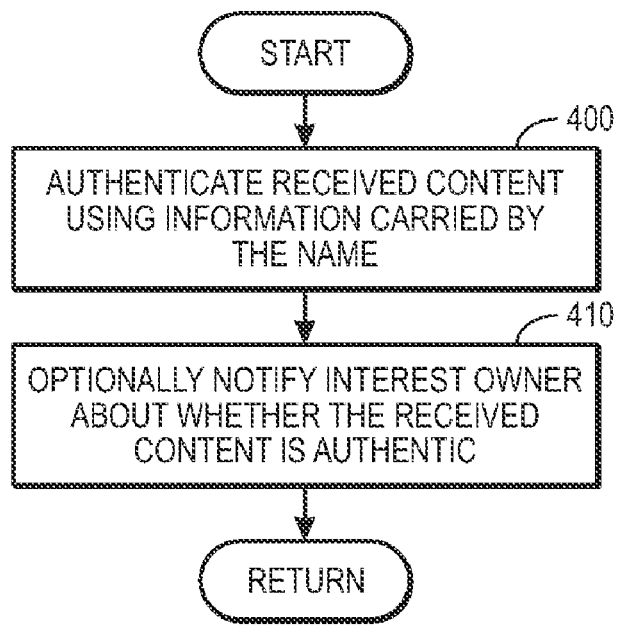
FIG. 4 presents a flowchart illustrating the process of authenticating received content using information carried by the content name in a CCN, in accordance with an embodiment of the present invention.

FIG. 4 presents a flowchart illustrating the process of authenticating received content using information carried by the content name in a CCN. The system first authenticates received content using information carried in the name of the content (operation 400). Next, the system optionally notifies the interest owner about whether the received content is authentic (operations 410).

Figure 5:
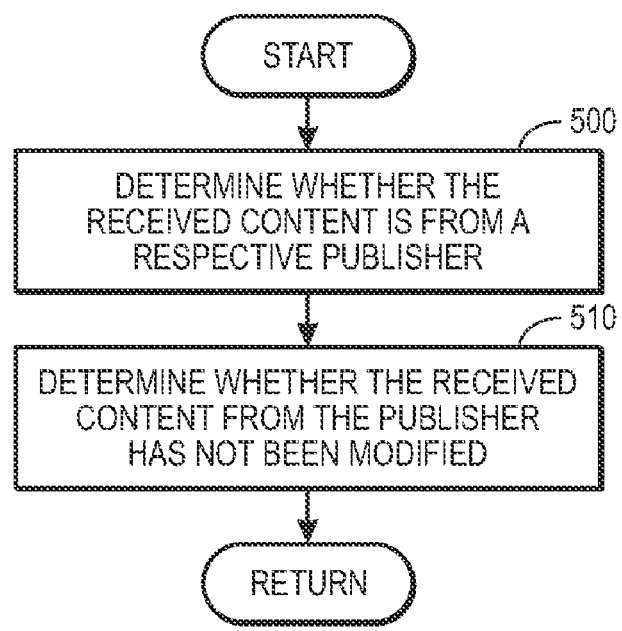
FIG. 5 presents a flowchart illustrating a process of authenticating received content in accordance with an embodiment of the present invention.

FIG. 5 presents a flowchart illustrating two methods the system uses for authentication. The system first determines whether the received content is from a publisher (operation 500). Next, it determines whether the received content from the publisher has not been modified (operation 510).

A CCN node can also serve as an authentication proxy to authenticate content arriving from outside of the CCN infrastructure. As noted above, each piece of CCN content is ideally publicly verifiable (e.g., with a digital signature). The system can use standard digital signatures as part of this authentication, or any other form of publicly verifiable signing to amortize the cost of single digital signatures over multiple pieces of content, possibly at the cost of only being able to verify those packets at some time after they are originally generated. Such a mechanism could take advantage of any existing or future developments in the cryptographic literature that allow for more efficient mechanisms, for example, for signing digital content streams.

To secure communication, the system can use standard end-to-end security measures to exchange keys and encrypt the content. In one embodiment, a node in the CCN can look up public keys for any registered node or content provider (publisher) and use those keys to decrypt data.

Dynamic Name-Based Routing

The system can use a structured name as an address, engineered like a traditional network address (e.g., an IP address) to efficiently access content by name. A single naming structure plays two roles in the system: ontological, to capture what the content is, where it was created, and by whom, and navigational, to allow the content to be found.

A CCN name can be a hierarchical structure for aggregation. The routing in a CCN can follow topologically efficient branches to get to a particular piece of content. In embodiments of the present invention, meaningful structure can be allowed in the content name. One approach to mapping navigational structure onto content names is to take advantage of current working distributed namespace, which is DNS. For example, content published at an organization can be published under the namespace organization.com, and content routers can (dynamically) determine that the vast majority of content with the prefix organization.com comes from that network location.

When a consumer asks for a piece of content by expressing an interest in a particular name, the CCN client can first ask for that content where it can be easily obtained (e.g., on a local network). If the system does not find it there, the interest can then be transmitted in the direction most likely to lead to that namespace, or name prefix (e.g., parc.com). The direction can be to a super-network, a sub-network, or another node in the local network. An upstream entity might have a cache of the content and return it, without communicating to the source of the content.

In one embodiment, the system can use an information-foraging model, where interests flow to where the content is most likely to be, and content flows back along the same path to return to the node expressing the interest. A CCN node receiving an interest on one of its network interfaces will forward that interest to other interfaces where it is more likely to reach matching content. At the same time, the CCN node will note on which interface the interest came in. When matching content is returned from an upstream network location, the node checks to see which of its interfaces matching interests arrived on, and sends the content back out according to that information "trail." In essence, the path followed by the interest serves as the route for the returned content.

Before sending content for which a response is expected, the sender can also express an interest in the response. The name given to the response content can be implicit given the content of the request, so it is possible to calculate the name (or a prefix of the name) ahead of time. This lock-step transaction creates a flow-control for CCN traffic: content is delivered only if it is asked for. In short, content follows interest. Thus, the CCN contains a mechanism for built-in flow control: it can ensure fairness and reliability by never sending more content than is wanted.

In one embodiment, each expressed interest by a given node retrieves one, and only one, fragment (e.g., packet) of content. The piece of content "consumes" the interest. To receive another fragment of content, the interest owner can express another interest. More succinctly, interests and fragments of content are paired. Pairing of interests with fragments of content provides several features. First, it provides efficient congestion control, which can be scaled automatically to the properties of each link, regardless of bandwidth. Second, it allows for the establishment of policies that can guarantee either fairness or controlled non-fairness as desired, the latter enabling the support of differentiated services.

A path for interests can be established through the CCN model of information forwarding to nodes that are likely to contain the content. In some embodiments, the CCN can allow a node to express an interest in an interest itself, by treating interests in essence as content. A node with content in a certain namespace can express an interest in interests looking for content in that namespace. That interest in interests will propagate through the CCN, establishing an information "trail" along which content interests will travel. This feature allows a content provider to solicit or "push" content to the content consumers or other nodes.

If a node can understand the semantics associated with certain name components, it can apply a policy to derive or remove spare names. Interests in and content under "local" name prefixes (e.g., /local) might not leave a given machine or a local network. Other forms of relative names might be resolved dynamically by the infrastructure (e.g., "this conference room," "this organization," "Tuesday afternoon"). The simplest of these relative names can serve the same purpose as site-local and link-local addresses in traditional networking. More sophisticated relative names can support more sophisticated applications.

Content can be associated in advance with a given name by a publisher, but the data corresponding to a particular name can be generated in real time. For example, the system can express an interest in interests for the namespace containing such names, allowing interests to be routed to that service. On receiving such specific interests, the content provider can then generate the content in response. That content can be cached in the CCN and returned in response to future matching queries without having to go back to the original content provider. Examples of such applications include digital rights management, where the interest can contain information about the content consumer sufficient to allow the content provider to check authorization and tailor content to that consumer.

In one embodiment, the system can maintain a number of outstanding interests in a content stream. When the stream is opened (or as network conditions change), the system can generate a number of interests in the same content. Each time the system receives content for that stream, it produces a new interest, thereby restoring the number of outstanding interests to that required by the pipeline. As a result, a CCN host can maintain multiple interests for the same content. In one embodiment, the system can coalesce these interests into an interest and a count while maintaining only a single instance of the content by a given name. As the content propagates backward toward the interest, the system decrements the counts. This way, the rate at which content arrives can be determined by the publisher (e.g., based on the data rate of the media codec) up to the limit set by the pipelined interest of the subscriber.

Generating an Interest in a Piece of Content

Figure 6:
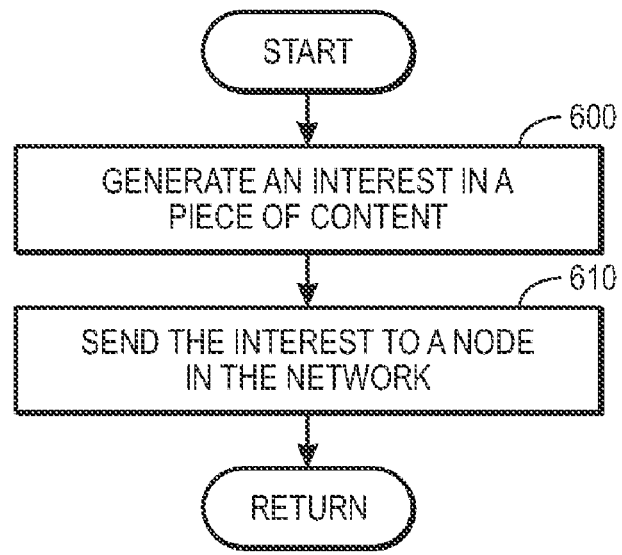
FIG. 6 presents a flowchart illustrating the process of generating an interest and sending it to a node in the CCN in accordance with an embodiment of the present invention.

In one embodiment, the system (or a human) can generate an interest in a piece of content, where the interest indicates a structured name for the content and where the name is unique and persistent with respect to the content. The name can include authentication information for the content. FIG. 6 illustrates this process in a flowchart. During operation the system first generates an interest in a piece of content (operation 600). Next, the system sends the interest to a node in the network (operation 610).

Computer and Communication System

Figure 7:
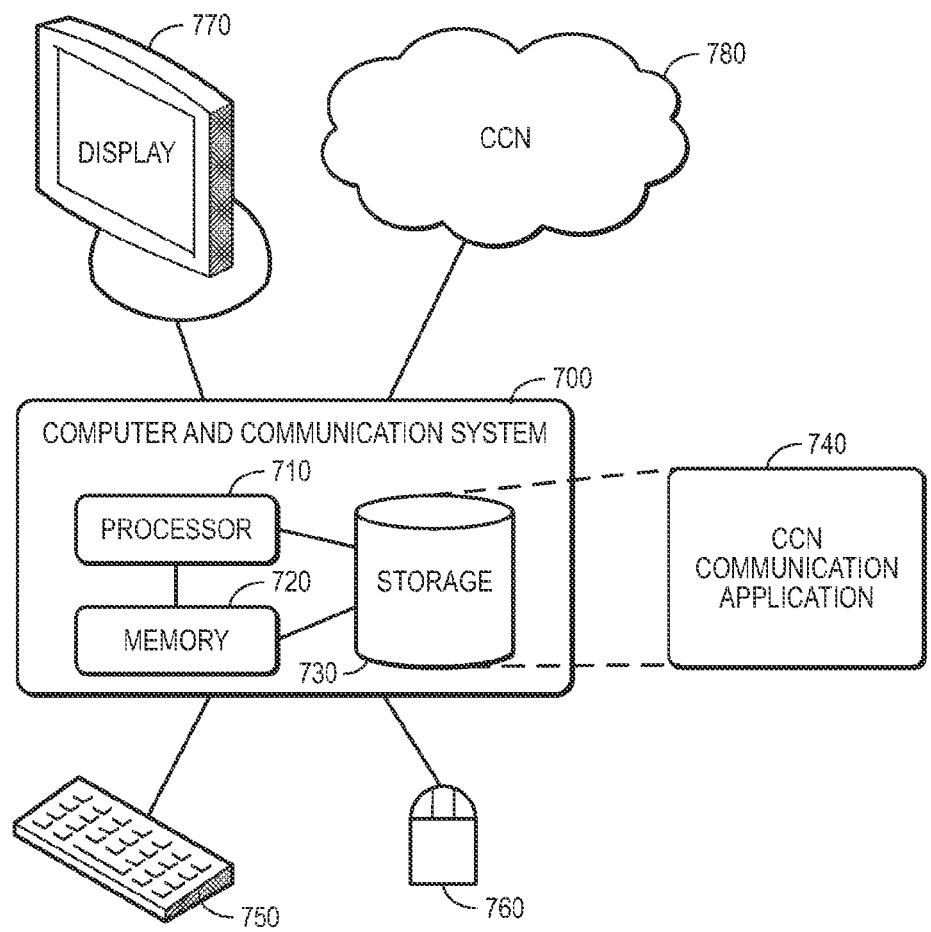
FIG. 7 presents an exemplary computer system for facilitating communication in a CCN in accordance with an embodiment of the present invention.

FIG. 7 presents an exemplary computer system for facilitating communication in a CCN in accordance with an embodiment of the present invention. In FIG. 7, a computer and communication system 700 includes a processor 710, a memory 720, and a storage device 730, all of which are coupled together. Storage device 730 stores programs to be executed by processor 710. Specifically, storage device 730 stores a program 740 that implements a system (application) for facilitating communication in a CCN.

Computer and communication system 700 is connected to and/or part of CCN 780 and can reside on any node in CCN 780. During operation, CCN communication application 740 is loaded from storage device 730 into memory 720 and executed by processor 710. As a result, computer and communication system 700 performs the functions described above.

FIG. 7 also shows an optional display 770, keyboard 750, and pointing device 760 connected to computer and communication system 700. The display, keyboard, and pointing device can facilitate generation of an interest and receipt and display of content.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executed method, comprising:
   receiving, by a computing device, an interest message requesting a collection of content,
      wherein the interest message indicates a structured name for the collection of content;
      wherein the structured name is hierarchical and not specific to a location, and a prefix of the structured name identifies the collection of content; and
      wherein the entire hierarchical structured name, including the prefix, remains unchanged when the collection of content changes its location;
   determining whether the requested collection of content corresponding to the interest message is available locally;
   responsive to the requested collection of content not being available locally:
      forwarding the interest message;
      receiving the requested collection of content in response to the forwarded interest message; and
      sending the requested collection of content to the owner of the interest message; and
   responsive to the requested collection of content being available locally, sending the requested collection of content to the owner of the interest message.

2. The method of claim 1, further comprising:
   determining whether the received collection of content satisfies the interest message; and optionally notifying the owner of the interest message about whether the received collection of content satisfies the interest message.

3. The method of claim 1, further comprising:
   authenticating the received collection of content using information carried by the structured name; and
   optionally notifying the owner of the interest message about whether the received collection of content is authentic.

4. The method of claim 3, wherein authenticating the received collection of content comprises:
   determining whether the received collection of content is from a respective publisher; and
   determining whether the received collection of content from the respective publisher has not been modified.

5. The method of claim 1, further comprising caching the received collection of content, thereby making the received collection of content available for future interest messages.

6. The method of claim 1, further comprising digitally signing the collection of content such that the collection of content can be verified by one or more nodes in the network.

7. The method of claim 1,
   wherein continued receipt of interest messages requesting a same collection of content facilitates flow control of delivery of the same collection of content.

8. The method of claim 1, further comprising receiving from a content provider a second interest message requesting the interest message, thereby allowing the content provider to solicit interest in the collection of content.

9. The method of claim 1, wherein the interest message is digitally signed, thus enabling the interest message to be authenticated prior to returning the collection of content in response to the interest message.

10. The method of claim 1, further comprising:
    responsive to the requested collection of content not being available locally, marking the interest message as pending; and
    responsive to receiving the requested collection of content, un-marking the interest message as pending.

11. A computer-executed method, comprising:
    generating, by a computing device, an interest message requesting a collection of content,
       wherein the interest message indicates a structured name for the collection of content;
       wherein the structured name is hierarchical and not specific to a location, and a prefix of the structured name identifies the collection of content; and
       wherein the entire hierarchical structured name, including the prefix, remains unchanged when the collection of content changes its location; and sending the interest message to a node in the network.

12. A computer system, comprising:
    a processor;
    a memory;
    a first receiving mechanism configured to receive an interest message requesting a collection of content,
       wherein the interest message indicates a structured name for the collection of content;
       wherein the structured name is hierarchical and not specific to a location, and a prefix of the structured name identifies the collection of content; and
       wherein the entire hierarchical structured name, including the prefix, remains unchanged when the collection of content changes its location;
    a determining mechanism configured to determine whether the requested collection of content corresponding to the interest message is available locally;
    a first sending mechanism configured to send the requested collection of content to an owner of the interest message in response to the requested collection of content being available locally;
    a forwarding mechanism configured to forward the interest message in response to the requested collection of content not being available locally;
    a second receiving mechanism, configured to receive the requested collection of content; and
    a second sending mechanism, configured to send the received collection of content to the owner of the interest message.

13. The computer system of claim 12, further comprising
a second determining mechanism configured to determine whether the received collection of content satisfies the interest message; and
an optional notifying mechanism configured to notify the interest message owner about whether the received collection of content satisfies the interest message.

14. The computer system of claim 12, further comprising:
an authentication mechanism configured to authenticate the received collection of content using information carried by the structured name; and
an optional second notification mechanism configured to notify the interest message owner about whether the received collection of content is authentic.

15. The computer system of claim 14, wherein while authenticating the received collection of content, the authentication mechanism is further configured to:
determine whether the received collection of content is from a respective publisher; and
determine whether the received collection of content from the respective publisher has not been modified.

16. The computer system of claim 12, further comprising a caching mechanism configured to cache the received collection of content, thereby making the received collection of content available for future interest messages.

17. The computer system of claim 12, further comprising a digital-signing mechanism configured to digitally sign the collection of content such that the collection of content can be verified by one or more nodes in the network.

18. The computer system of claim 12,
wherein continued receipt of interest messages requesting a same collection of content facilitates flow control of delivery of the same collection of content.

19. The computer system of claim 12, further comprising a third receiving mechanism configured to receive from a content provider a second interest message requesting the interest message, thereby allowing the content provider to solicit interest messages in the collection of content.

20. The computer system of claim 12, wherein the interest message is digitally signed, thus enabling the interest message to be authenticated prior to returning the collection of content in response to the interest message.

21. The computer system of claim 12, further comprising:
a marking mechanism configured to mark the interest message as pending in response to the requested collection of content not being available locally; and
an un-marking mechanism configured to un-mark the interest message as pending in response to receiving the requested collection of content.

22. A computer system, comprising:
a processor;
an interest message generating mechanism, configured to generate an interest message requesting a collection of content,
wherein the interest message indicates a structured name for the piece of content;
wherein the structured name is hierarchical and not specific to a location, and a prefix of the structured name identifies the collection of content; and
wherein the entire hierarchical structured name, including the prefix, remains unchanged when the collection of content changes its location; and
a sending mechanism configured to send the interest message to a node in the network.

* * * * *